United States Patent
Miller

(10) Patent No.: US 8,522,031 B2
(45) Date of Patent: Aug. 27, 2013

(54) METHOD AND APPARATUS FOR ESTABLISHING A TRUSTED AND SECURE RELATIONSHIP BETWEEN TWO PARTIES CONNECTED TO A NETWORK

(75) Inventor: Bruce D. Miller, North Reading, MA (US)

(73) Assignee: Force 10 Networks, Inc., San Jose, CA (US)

( * ) Notice: Subject to any disclaimer, the term of this patent is extended or adjusted under 35 U.S.C. 154(b) by 334 days.

(21) Appl. No.: 12/779,989

(22) Filed: May 14, 2010

(65) Prior Publication Data
US 2011/0283108 A1    Nov. 17, 2011

(51) Int. Cl.
*H04L 9/32* (2006.01)
(52) U.S. Cl.
USPC .......................................................... 713/175
(58) Field of Classification Search
None
See application file for complete search history.

(56) References Cited

U.S. PATENT DOCUMENTS

| 5,689,565 A * | 11/1997 | Spies et al. ..................... 713/189 |
| 7,966,487 B2 * | 6/2011 | Engberg et al. ................ 713/175 |
| 2004/0133511 A1 * | 7/2004 | Smith et al. ..................... 705/39 |

* cited by examiner

*Primary Examiner* — Brandon Hoffman
(74) *Attorney, Agent, or Firm* — Haynes and Boone, LLP

(57) ABSTRACT

A trusted relationship service includes a certificate authentication server and a secure file host. The certificate authentication server operates to receive requests from a supplier and a customer to register with the service, verifies the identities of the supplier and the customer and sends digital certificates to both the supplier and the customer. The supplier can send information to the trusted relationship service where it is posted in a secure file host. The supplier can solicit the customer to visit the trusted relationship service web site to view the supplier information stored there, whereupon the customer can use their digital certificate to access the trusted relationship service site and is granted permission by the site to view the supplier information.

19 Claims, 7 Drawing Sheets

METHOD AND APPARATUS FOR ESTABLISHING A TRUSTED AND SECURE RELATIONSHIP BETWEEN TWO PARTIES CONNECTED TO A NETWORK

BACKGROUND

1. Field of the Invention

The invention relates generally to the area of communications network security and specifically to the assignment of digital certificates to parties using the communications network.

2. Description of the Related Art

Establishing and maintaining trusted, secure communications between two or more individuals or entities in a public network such as the Internet can be a valuable and/or necessary business tool. Many reputable business entities develop a portion or their entire customer base by sending unsolicited electronic messages over the Internet to potential customers that they have identified by any one of a number of well known techniques. These unsolicited messages may include information concerning a product or service offering and may also include a request for certain customer information, such as their electronic address, contact information or other private and sensitive customer information. Unfortunately, a large number of such electronic solicitations are illicit attempts to gather information from customers. This activity is known as "phishing" and any information gathered by such methods may then be used in activities not approved by the customer. In the event that the potential customer is able to authenticate the source of the unsolicited electronic message, they may be motivated to respond to the solicitation. In this case, the authentication process may be simply looking up the businesses name in a phone book and contacting them to ask some pertinent questions, the process may include contacting associates and asking them to verify the identification of the solicitor or any one or a number of other authentication activities. However, in most cases, unsolicited electronic messages are never accepted or examined by the potential customers and so this form of business development tends to be very inefficient.

One method that is employed to establish a trusted relationship between two parties is to assign a digital certificate (also called a public key certificate) to each of the parties. The digital certificate is a binding between a specific identity and a public key and optionally a private key. An exchange of digital certificates allows the parties to verify the identity of the other and confirm that they have valid public keys to use for secure communication and transactions.

Another method that is employed to establish a trusted relationship between two parties is for a trusted third party to assign a digital certificate to each of the first two parties. The trusted third party can be referred to as a certificate authority (CA). The certificate authority is essentially a well known service that supplies digital certificates upon request to parties whose identification can be verified. Once a party receives the digital certificate from the CA, they can then communicate in a secure manner with others who have received a digital certificate from the same CA. In effect, each party receiving a digital certificate from the same CA can expect that communications received from the other parties are secure and authentic. That is, that the communications are sent by the party identified by the digital certificate. This sort of secure relationship is referred to as third-party trust.

Establishing trusted relationships either directly or by third-party trust is typically suitable for interpersonal communication or for communication among a controlled group of individuals or entities. However, the prior art method employed in establishing a secure relationship between a supplier of goods or services and a base of customers does not scale well when the desired customer base grows into the thousands and when at least a portion of the potential or targeted customers are not interested in the goods or services being offered by the supplier.

SUMMARY

A method for establishing a trusted relationship between a first and second party is managed by a third party certificate authority. The first and second parties do not communicate directly with each other during a certification process where each party's identity is certified by the certificate authority. Certification of the first and second party's identity is maintained by the third party certificate authority; a secure communication occurs between the two parties and the third party only. Communication between the end parties is considered insecure and only serves to provide notification of availability of information securely held by the third party. A first party supplier can post secure information on the third parties web site, send a message to the second party advertising the information posted at the secure third party web site and the second party, knowing that the information stored at the web site is secure and certified, can access this information. In this way two parties without an "a-prior" secure relationship can exchange information using a secure third party.

DETAILED DESCRIPTION

Figure 1:
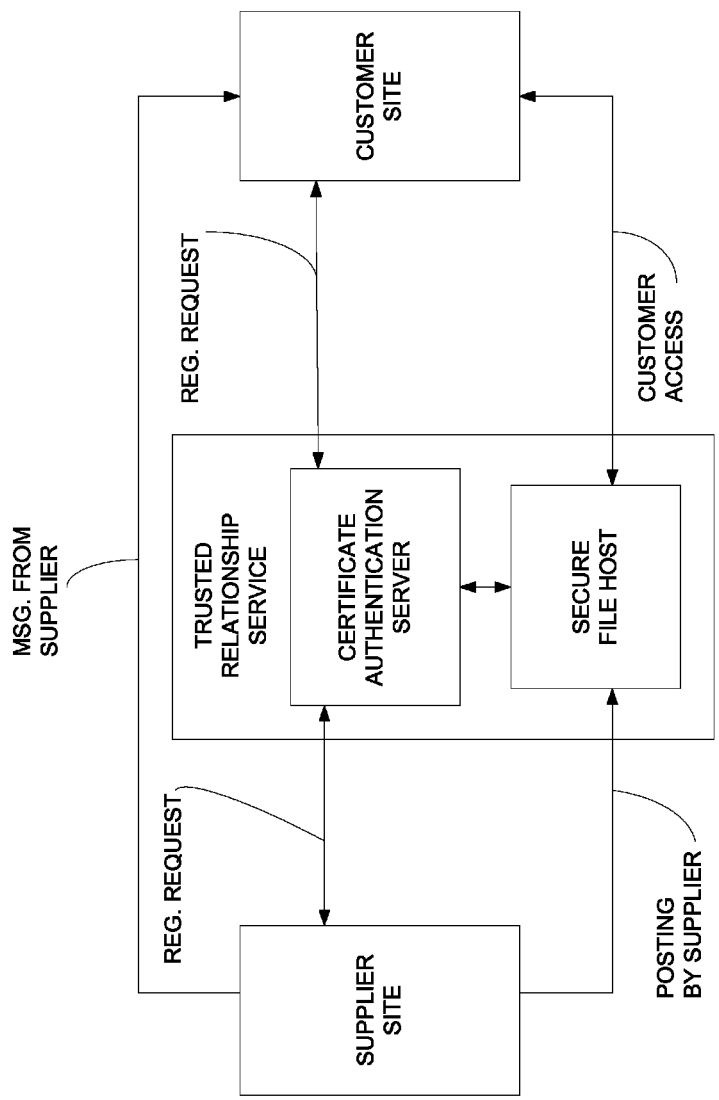
FIG. 1 is a diagram of first, second and third party sites located in a public communications network.

FIG. 1 is a diagram of a portion of a public communications network, such as the Internet, that includes a supplier site, a customer site and a trusted relationship service site. The supplier site can include a computational device, such as a server, that operates to send and receive information over the communications network and to store information about the products or services offered by the supplier that owns or has access to the server. The trusted relationship service, hereinafter referred to as simply "the service", generally operates to authenticate parties, to issue digital certificates, to maintain a secure store of supplier information and to generally manage customer access to the supplier information. The customer site can be comprised of any computational device capable of connecting to the communications network for the purpose of requesting and receiving supplier product or service information. It should be understood that although FIG. 1 shows only one supplier site and one customer site, the network arrangement shown can be comprised of a plurality of suppliers and a plurality of customers. Typically there will only be one trusted relationship service to manage the trusted relationships between the suppliers and the customers. Further, it should be understood that although FIG. 1 shows the trusted relationship service comprised of the certificate authentication server and secure file host, the certificate authentication server and the secure file host can each be under the control of different services. So for instance, the trusted relationship service can issue digital certificates and some other service (dBase service) can be responsible for managing the secure file host.

With further reference to FIG. 1, suppliers are motivated to develop trusted relationships with as many customers as possible in order to increase the size of their business. At the same time, customers are motivated to only receive solicitations to provide products or services from suppliers which the customers know provide some useful service or product, and that they know are not merely phishing for customer information. In this case, the trusted relationship service can position the suppliers to provide product or service information to a large number of customers and can provide the customers with access to large variety of supplier information that the customer knows is from a trusted source. The trusted relationship service establishes the secure and trusted supplier/customer relationship by assigning digital certificates to each supplier and customer that the service authenticates, provides a secure location where a supplier can post product or services information which information can be accessed by the customers in a trusted and secure manner.

Figure 2:
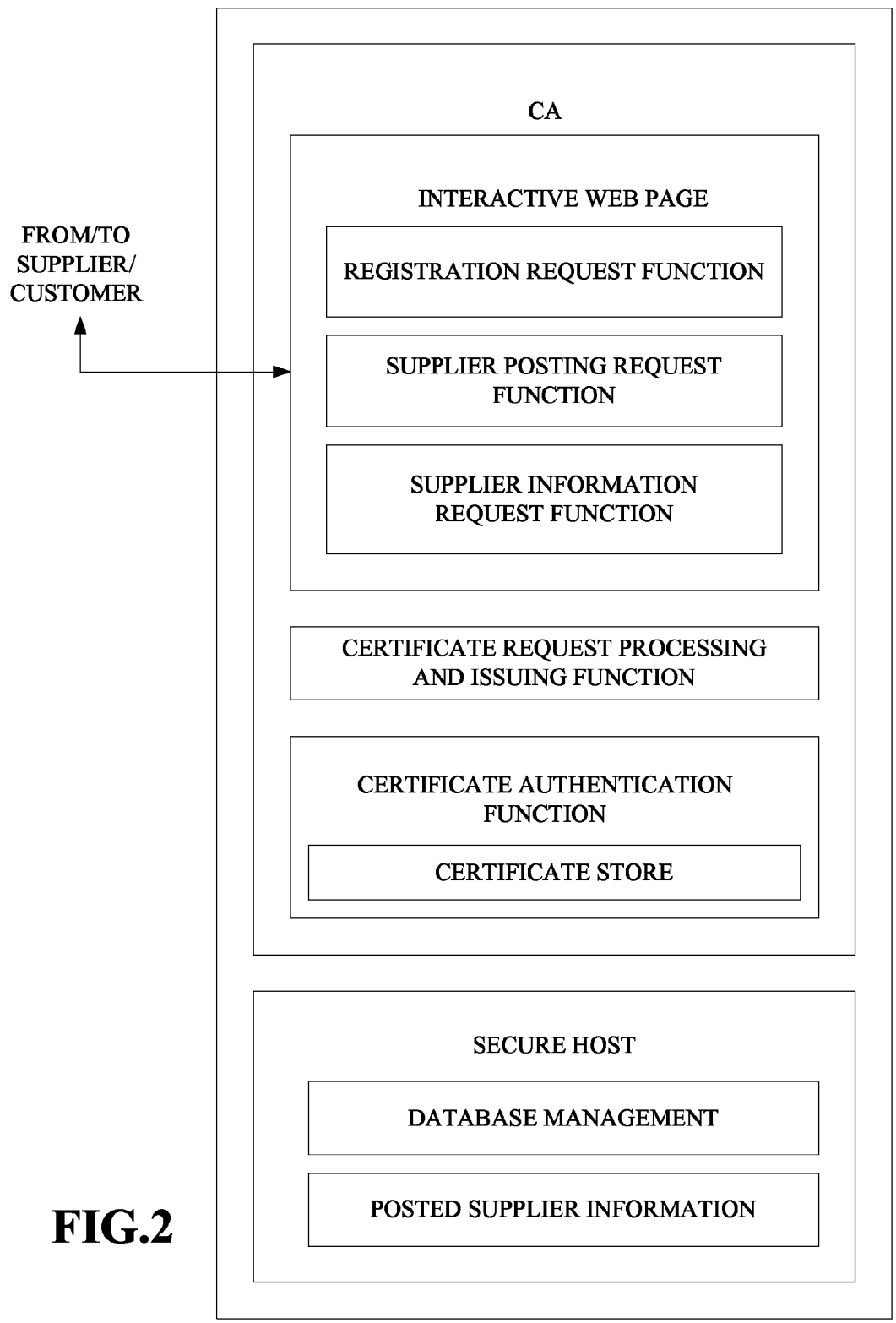
FIG. 2 is a diagram of the third party's authentication server.

FIG. 2 is a block diagram that includes functionality that permits the service to establish relationships between suppliers and customers registered to use the service and the functionality that allows a supplier to securely post supplier information (can be product, services, or any other information that the supplier would like to distribute to their customer base) that they would like to distribute to as many potential customers as possible. In one embodiment, the trusted relationship service is comprised of a certificate authority (CA) which receives requests for digital certificates and issues digital certificates and a secure host which maintains information posted to the service by the supplier and which permits secure access to this information by customers registered to use the service. The CA is comprised of an interactive web page, a digital certificate request processing and issuing function and an authentication function. The interactive web page can be created using any commercially available dynamic web page development tool and the web page can include links to a registration request function, a supplier information posting function and a supplier information request function. The registration request function can be an editable form (in dynamic HTML format for instance) accessible via the web page that a supplier or a customer can use to register with the service and to request a digital certificate. The supplier information posting function can be an editable form only accessible by a registered supplier for the purpose of posting information to the secure host database. The supplier information request function can also be an editable form accessible via the web page that a customer registered to use the service can employ to request information that a supplier has posted to the secure host. The certificate request processing and issuing function included in the CA operates on information that it receives from the registration request function to authenticate the identity of a supplier or customer requesting to register with the service. A portion of the authentication process can be automatic and portion of the authentication process can be performed manually by an individual, regardless, the result of this functions operating is to either accept or deny the request for registration. In the event that the registration request is accepted, then the digital certificate issuing function automatically generates a digital certificate that includes enough information to uniquely identify a supplier or customer. This allows both parties to then have a verified set of public keys and optionally a private key that they can use for secure communication. Typically, a message will be encrypted with a public key, but it can only be decrypted with both the public key and a private key. The private key is a kept secret known only to one party. A mathematical relationship exists between the private and public key pair creating the appropriate encoding and decoding relationships. The secure host can include a database management system that operates to manage the storage of and access to information posted to the service by a registered supplier. The information posted by the supplier to the service can be stored in any type of mass storage device, such as on disk or in a large memory array.

Figure 3:
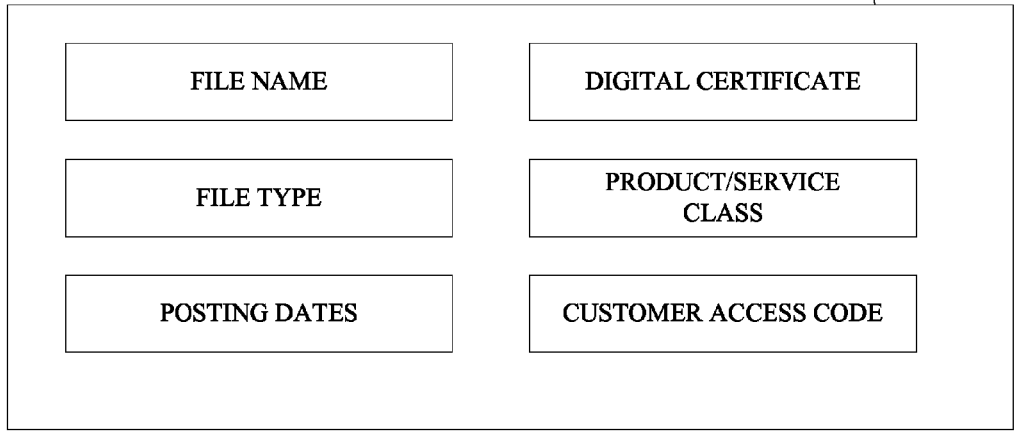
FIG. 3 is an illustration of the functionality included in a web page stored at the third party site.

FIG. 3 is an illustration of an editable form that can be used by a registered supplier to post product, services or other supplier related information to the secure host database. The supplier posting form can include a field for the file containing the information to be posted along with the file name, a field for the posting dates, a field for a short description of the file contents (product information, services information, etc.) and the form can include a field for an optional customer access group code. This access group code limits access to only those customers who are members of a particular group. For instance, a supplier might group customers according to some priority so that only "preferred" customers can gain access to information about particular discounts to products or services offered by the supplier.

Figure 4:
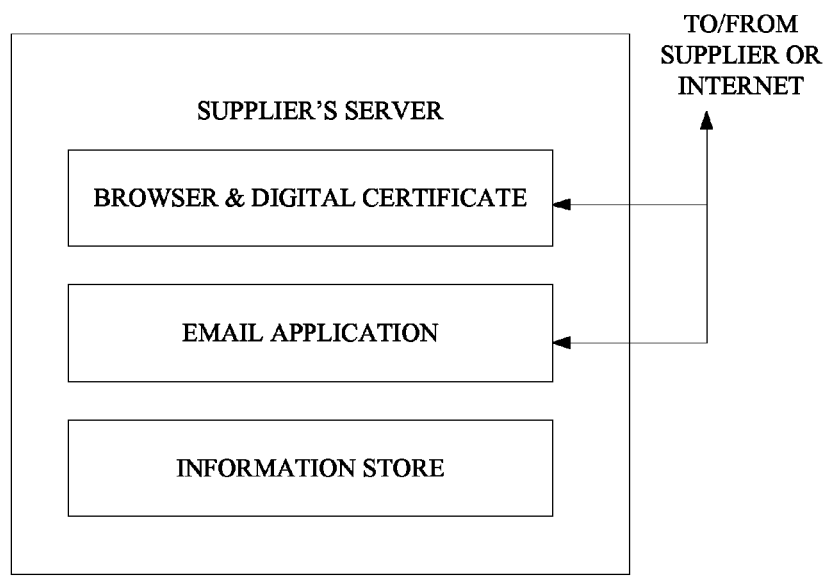
FIG. 4 is a block diagram of the third party server.

FIG. 4 is a diagram of a communications network device controlled by the supplier showing functionality that can be employed to post information to the secure host maintained by the service and to communicate directly with their customers. This device can be a server or any computational device capable of storing information and transferring this information over the communications network to the service. The supplier's server can include a web browser for accessing the interactive web page supported by the service and described earlier with reference to FIG. 2. The server can include either memory or disk storage for storing information pertaining to the supplier that can be posted to the secure host maintained by the service and the server can store the digital certificate issued by the certificate authority. The supplier's server also includes an electronic messaging application that is used to send messages directly to customers registered to use the service. The digital certificate includes a public key that is used to encrypt communication sent by the supplier to the relationship service and the certificate can also include a private key that can be used to attach a digital signature to communication with the relationship service. Messages sent from the supplier directly to the customer are not secure and are sent for the purpose of announcing to the customer that supplier information is available to be viewed at the secure host maintained by the service.

Figure 5:
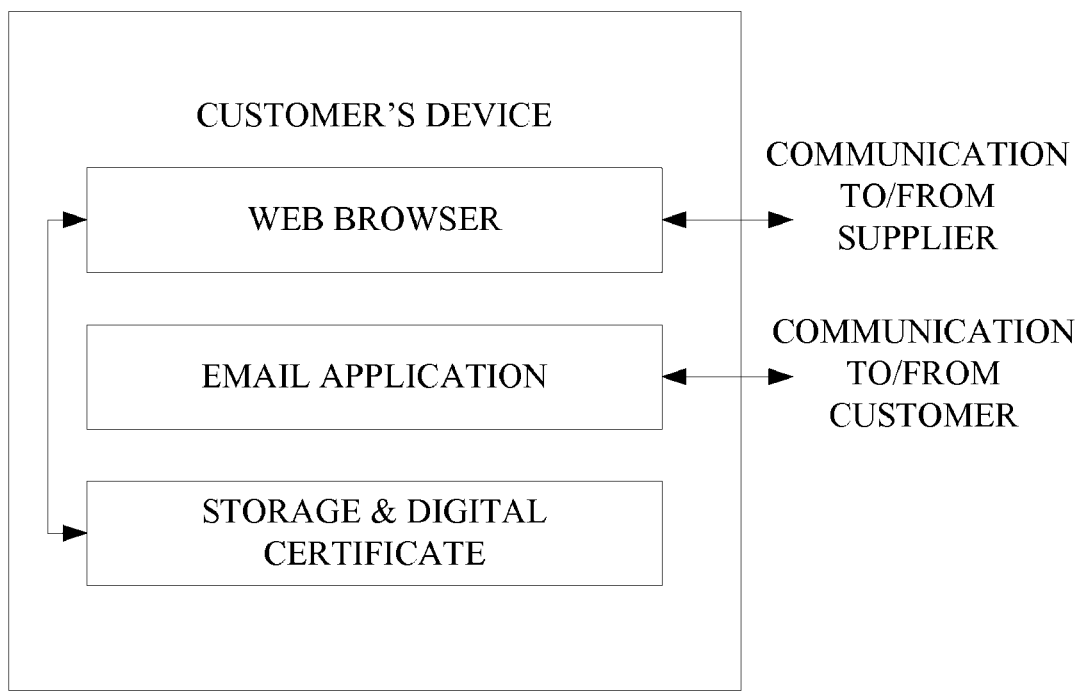
FIG. 5 is a diagram of the second party client device.

FIG. 5 is a diagram of a communications network device that can be used by a customer to access the secure host to view and to download supplier information posted there. The customer device can be any computational device that is capable of establishing a communication session with the service for the purpose of viewing and/or downloading supplier information posted there. The customer device can include a web browser that is used to access the supplier information request function in the interactive web page maintained by the service. The customer's device can include an electronic messaging application for receiving messages directly from their suppliers and the customer's device can include storage to store information downloaded from the database maintained by the secure host and for storing a digital certificate issued to the customer by the service. This digital certificate can include a public key and a private key that can be used during communication with the relationship service.

Figure 6A:
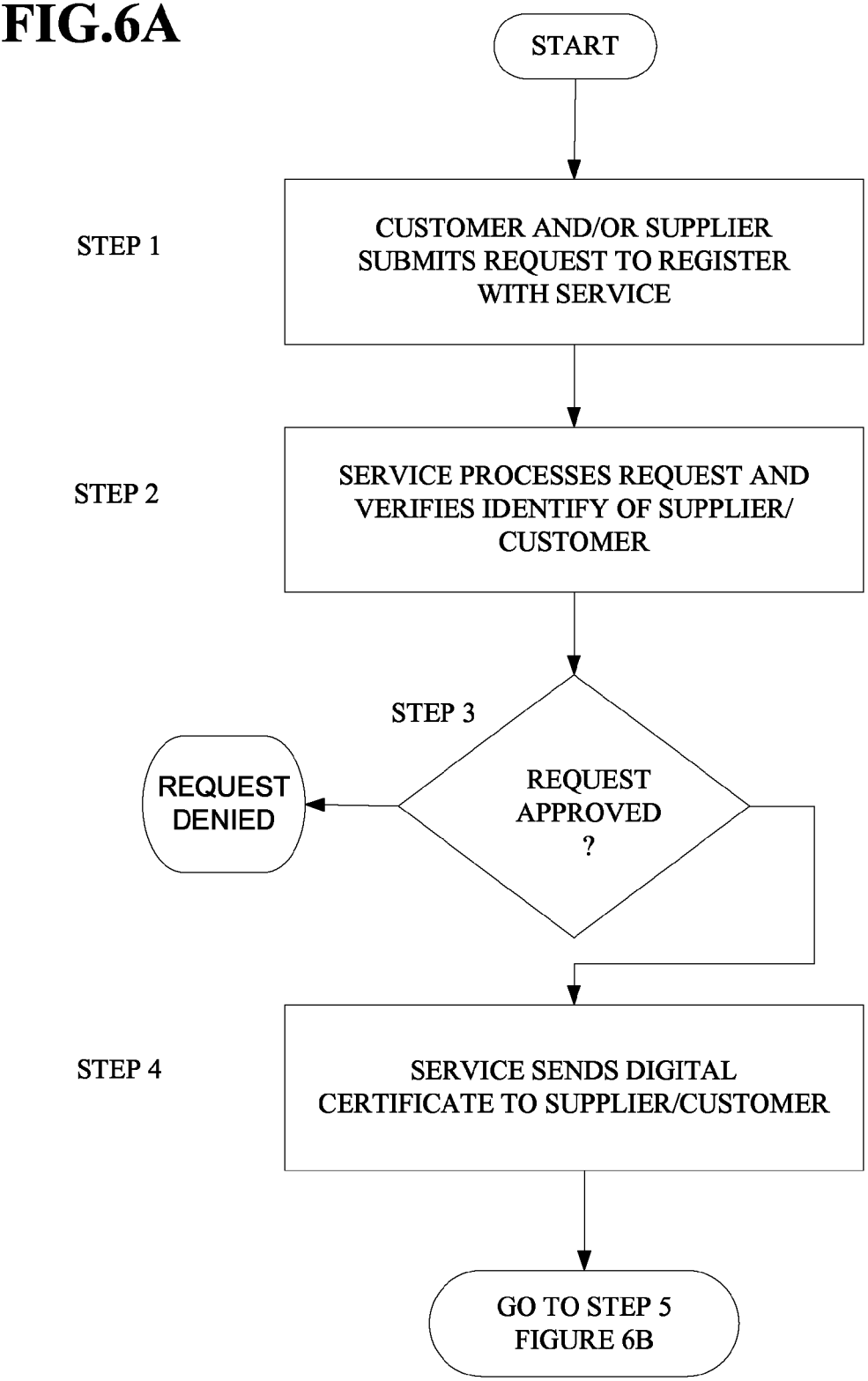
FIG. 6 is a logical flow chart of the establishment of a secure two party relationship.
Figure 6B:
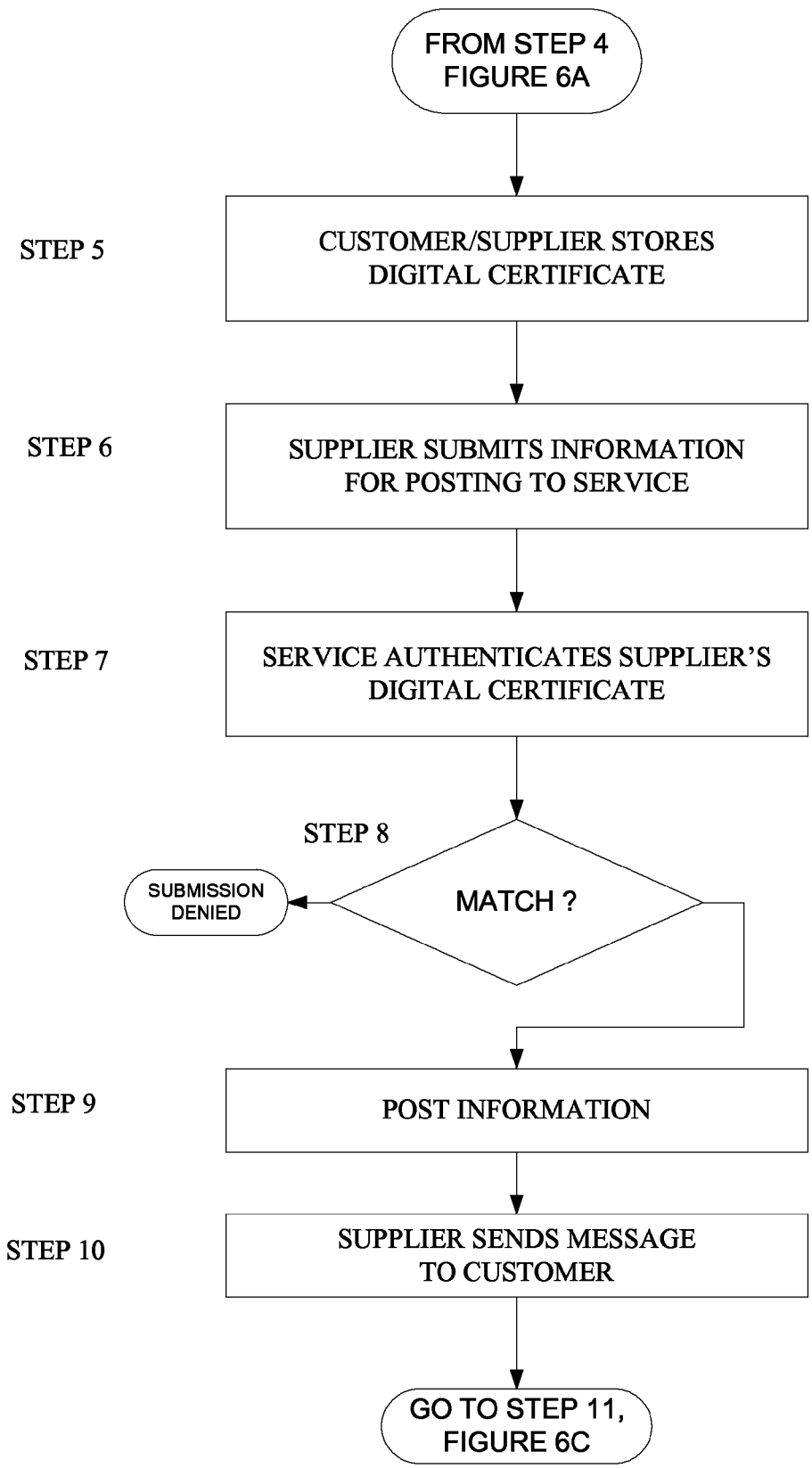
Figure 6C:
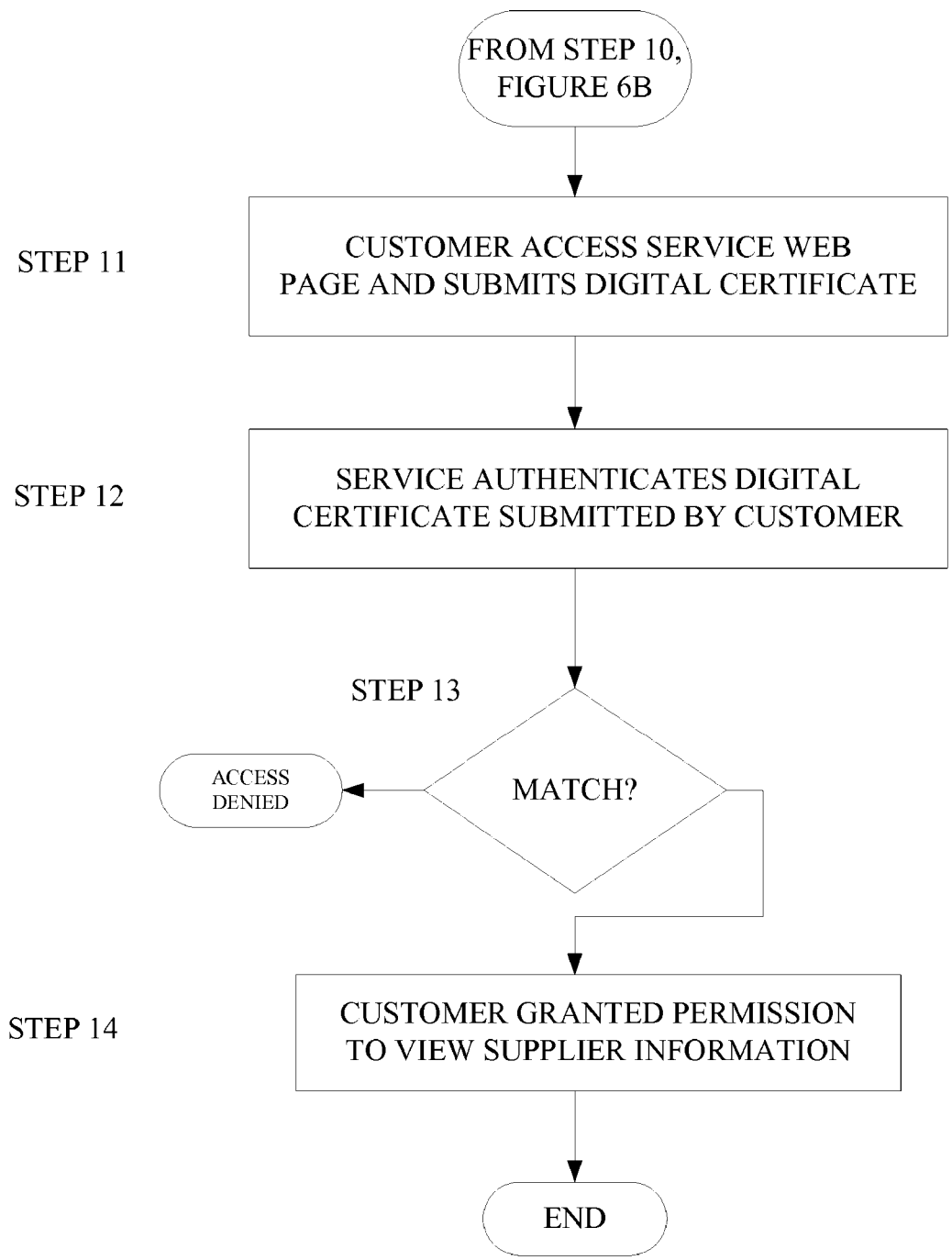

FIG. 6 is a logical flow diagram which describes in detail the processes employed by the service to establish trusted relationships between suppliers and customers and for maintaining a secure host for storing supplier information which is only accessible by customers registered to use the service. It should be understood, that in the preferred embodiment, the suppliers and customers never directly exchange security information and that there is no direct exchange of information between a supplier and a customer. The service establishes and maintains trusted relationships between suppliers and customers and also maintains a secure store of supplier information only accessible by particular customers registered to use the service. Further, it should be understood that a secure session can be established between the relationship service and the supplier or customer (depending upon the transaction) and the only unsecure step in the process is notification from the supplier to the customer that information is available at the secure web site.

In step 1 of FIG. 6, a customer and/or supplier goes to the service's web page and fills in the registration request form described earlier with reference to FIG. 2. In step 2, the registration request function sends some or all of the information contained in the request form to the digital certificate request processing function where the information is authenticated. As described earlier, the authentication process can be entirely automated, entirely manual or a combination of both. Regardless, in step 3, if the request to register with the service is denied, the process ends. On the other hand, if the registration request is accepted, the process proceeds to step 4 and the service sends a message or other correspondence to the customer and/or supplier which includes, among other things, a digital certificate which is comprised of a public key. In step 5, the supplier and/or customer stores the digital certificate which will be used later when communicating with the service. In step 6, the supplier can submit information to the secure host that is maintained by the service and request that it be posted. The submitted information is encrypted using the public key issued by the CA or a private key. The submitted information can include information about products offered for sale by the supplier, services offered by the supplier or any other information that the supplier wishes to distribute to their customers. The supplier can use the posting form located at the service's web page to submit this information. In step 7, the certificate authentication function described earlier with reference to FIG. 2 receives some or all of the information included in the form (but at least the digital certificate) filled in by the supplier and can use a private key to authenticate that the information submitted is from a trusted supplier. If, in step 8, the private key is not able to decrypt the submitted information, then the information submitted to the service for posting is rejected. On the other hand, if the private key is able to decrypt the submitted information, then, in step 9 the information submitted by the supplier is posted to the supplier information database maintained by the secure host.

At this point, in step 10 of FIG. 6, the supplier can send an unsecure electronic message directly to one or more customers registered with the service. The message can be an invitation to the customer to go to the web page maintained by the service to view the information posted by the supplier and stored in the supplier database maintained by the secure host. After receiving the message from the supplier, the customer can open the message or not; regardless, the customer, in step 11, can access the web page maintained by the service and request to view or download the information posted to the service by the supplier. To make this request, the customer can fill out a form associated with the supplier information request function that was described earlier with reference to FIG. 2. The customer can then either send the form unencrypted or encrypted using a private key. In step 12, the certificate authentication function described previously with reference to FIG. 2 receives request submitted by the customer and verifies the identity of the customer. If, in step 13, the identity of the customer cannot be verified, the request to view the supplier information is denied. On the other hand, if the identity of the customer is authenticated, the customer is permitted to view at least the information referenced in the supplier's message to the customer. The customer may choose to view this information or to download this information to their network device. Regardless, only customers who are registered with the service and who are issued digital certificates that match a digital certificate currently stored in the service's store of certificates are permitted by the service to access the supplier information. By the same token, the service will only post information submitted by suppliers who can be authenticated by the relationship service.

The process described with reference to FIG. 6, shields customers from the harmful effects of phishing activity and allows them access to trusted supplier information without the need for the customer establishing a trusted relationship with a supplier directly. According to the preferred embodiment, a third party service operates to certify the authenticity of suppliers and customers and to certify the authenticity of supplier information so that customers can be sure that the supplier information originates from a trusted source.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A method for providing secure access to trusted information, comprising:
   a trusted relationship service issuing unique identification information to a supplier and to a customer;
   the trusted relationship service receiving the unique identification information from the supplier along with information for distribution to the customer;
   the trusted relationship service storing the information for distribution to the customer that was received from the supplier in response to authenticating the unique identification information received from the supplier;
   the trusted relationship service receiving the unique identification information from the customer along with a request to access the information for distribution to the customer that was received from the supplier and stored by the trusted relationship service; and
   the trusted relationship service granting the customer access to the information for distribution to the customer that was received from the supplier and stored by the trusted relationship service in response to authenticating the unique identification information received from the customer.

2. The method of claim 1 wherein the unique identification information is a digital certificate.

3. The method of claim 2 wherein the digital certificate is comprised of a serial number, a party being identified, an algorithm used to create a signature, an identification of the trusted relationship service, a period of time during which the digital certificate is valid, a purpose of a public key, a public key, an algorithm used to hash the digital certificate, and a hash.

4. The method of claim 1 wherein the information for distribution to the customer that was received from the supplier is comprised of one or more of product information, services information, and information relating to discounts offered on products or services.

5. The method of claim 1 wherein authenticating the unique identification information received from the supplier includes the trusted relationship service successfully decrypting the information for distribution to the customer that was received from the supplier.

6. The method of claim 1 wherein the trusted relationship service is also a certificate authority.

7. The method of claim 1 wherein the information for distribution to the customer that was received from the supplier is stored on a secure host.

8. A method for providing secure access to trusted information, comprising:
   a trusted relationship service party receiving unique identification information issued to a supplier party and to a customer party from a certificate authority;
   the trusted relationship service party receiving the unique identification information from the supplier party along with information for distribution to the customer party;
   the trusted relationship service party storing the information for distribution to the customer party that was received from the supplier party on a secure host in response to authenticating the unique identification information received from the supplier party;
   the trusted relationship service party receiving the unique identification information from the customer party along with a request to access the information for distribution to the customer party that was received from the supplier party and stored on the secure host; and
   the trusted relationship service party granting the customer party access to the information for distribution to the customer party that was received from the supplier party and stored on the secure host in response to authenticating the unique identification information received from the customer party.

9. The method of claim 8 wherein the unique identification information is a digital certificate.

10. The method of claim 9 wherein the digital certificate is comprised of a serial number, a party being identified, an algorithm used to create a signature, an identification of the trusted relationship service party, a period of time during which the digital certificate is valid, a purpose of a public key, a public key, an algorithm used to hash the digital certificate, and a hash.

11. The method of claim 8 wherein the information for distribution to the customer party that was received from the supplier party is comprised of one or more of product information, services information, and information relating to discounts offered on products or services.

12. The method of claim 8 wherein authenticating the unique identification information received from the supplier party includes the trusted relationship service party successfully decrypting the information for distribution to the customer party that was received from the supplier party.

13. The method of claim 8 wherein the trusted relationship service party is also the certificate authority.

14. The method of claim 8 wherein the secure host is controlled by the trusted relationship service party.

15. An apparatus for providing secure access to trusted information, comprising:
   a trusted relationship service network communications device comprising:
      a memory module that stores interactive web page functionality which operates to:
         receive registration requests from each of a supplier and a customer;
         receive requests from the supplier to store information for distribution to the customer on a secure host, along with unique identification information for the supplier; and
         receive requests from the customer to access the information for distribution to the customer and stored on the secure host, along with unique identification information for the customer;
      wherein the memory module also stores certificate request processing and issuing functionality which operates to:
         receive, authenticate and issue the unique identification information to the supplier and customer in response to the registration requests received from the supplier and customer by the interactive web page functionality; and
      wherein the memory module also stores certificate authentication functionality which operates to:
      grant the request received by the interactive web page functionality from the supplier to store the information for distribution to the customer on the secure host in response to authenticating that request using the unique identification information received by the interactive web page functionality from the supplier; and;
      grant the request received by the interactive web page functionality from the customer to access the information for distribution to the customer stored on the secure host in response to authenticating that request using the unique identification information received by the interactive web page functionality from the customer.

16. The apparatus of claim 15 wherein the trusted relationship service network communications device is a computational device that is operable to host an interactive web page, perform certificate authentication and issuing, and maintain a database on the secure host.

17. The apparatus of claim 15 wherein the memory module is comprised of an array of one or more hardware memory devices, optical disk storage, or magneto-optical disk storage.

18. The apparatus of claim 15 wherein the unique identification information issued by the certificate request processing and issuing functionality is a digital certificate.

19. The apparatus of claim 18 wherein the digital certificate is comprised of a serial number, a party being identified, an algorithm used to create a signature, an identification of a trusted relationship service, a period of time during which the digital certificate is valid, a purpose of a public key, a public key, an algorithm used to hash the digital certificate, and a hash.

* * * * *